United States Patent Office 2,890,126
Patented June 9, 1959

2,890,126

CELLULATED SILICA AND THE PRODUCTION THEREOF

Walter D. Ford, Port Allegany, Pa., assignor to Pittsburgh Corning Corporation, Allegheny County, Pa., a corporation of Pennsylvania No Drawing. Application April 11, 1957
Serial No. 652,098

12 Claims. (Cl. 106—40)

This invention relates to cellulated silica and to methods for the production thereof. More particularly it relates to the production of cellulated silica, characterized by a multiplicity of regularly distributed uniform closed cells, by heating silica in the presence of a carbonaceous cellulating agent at a temperature sufficient to cause the silica to soften and sinter or cohere into a viscous mass and then to a higher temperature sufficient to cause the cellulating agent to react with the silica to form gases which expand the plastic mass and form closed cells. The invention also relates to the product produced by the foregoing method.

This application is a continuation-in-part of a prior application, Serial No. 290,567, filed May 28, 1952, now abandoned.

Silica exists in a variety of crystalline forms, the most common being quartz. It is a high melting refractory material. For instance, quartz is the lowest melting of the crystalline modifications of silica and its melting point is about 2600° F. Other forms of silica, such as cristobalite and tridymite, melt above 3000° F. By reason of these extremely high melting points and the highly viscous nature of the plastic mass of fused silica, prior attempts to produce a cellulated silica have been unsuccessful. For instance, Watson, U.S. Patent No. 1,669,363, attempted to produce a cellular silica product but his experiments have led to no commercially satisfactory product. The minimum specific gravity of his so-called "cellular silica" was 0.6 (approximately 37 lbs. per cubic foot) which rendered the product virtually useless as a commercial insulating material. Likewise, the cellular consistency of the Watson product was far from uniform and the cell size varied substantially. In no case was Watson successful in producing cellulated silica having low density (8 to 16 lbs. per cubic foot) and small, uniform cell size.

Silica is characterized by great thermal shock resistance, high durability, imperviousness to liquids and gases and resistance to attack by moisture. In cellular form and of low density, it is eminently useful as an insulating material for high and low temperatures because of the foregoing properties as well as its high refractory qualities which resist disintegration at high temperature.

It is an object of this invention to produce uniformly cellulated silica. It is another object to produce cellulated silica exhibiting uniform cell size and low density in the range of 8 to 16 lbs. per cubic foot. It is a further object of this invention to provide methods for producing uniformly cellulated silica having noncommunicating cells by the use of carbonaceous cellulating agents. These and other objects will be apparent from and are accomplished in accordance with the following disclosure.

Broadly the present invention comprises the production of cellulated silica by forming a homogeneous pulverulent mixture of finely ground or divided silica and from 0.1 to 5% by weight of a finely divided carbonaceous cellulating agent, heating said mixture in a non-oxidizing or reducing atmosphere (e.g. nitrogen or argon) to a temperature sufficient to cause sintering of the silica particles, that is, to cause the particles to soften and cohere into a highly viscous plastic mass which entraps or suspends the cellulating agent which is uniformly dispersed therethrough by virtue of the intimate mixing, then raising the temperature to a higher level which is sufficient to cause the entrapped or suspended cellulating agent of carbonaceous material to react with the silica to produce entrapped gases which expand to form closed cells of small but uniform size within the plastic mass. Thereafter the cellular mass is preferably rapidly cooled to a temperature at which the outer surfaces thereof harden to form a stable body of cellulated silica and prevent "dishing" or shrinking of the cellulated silica ware.

By the technique broadly discussed above it is possible to produce cellulated silica on a large scale having a density in the range of 8 to 16 lbs. per cubic foot and having a uniform closed cell structure wherein the cells are of a diameter in the range of $\frac{1}{32}$ to $\frac{1}{16}$ of an inch. The cellulated body of silica so produced has a very low coefficient of heat transmission and serves as an excellent light-weight insulating material which has much wider applicability than cellular glass. While cellular glass is an excellent insulating material, it is subject to all of the limitations of glass as to brittleness, weathering, and thermal shock.

In order to successfully achieve the goals of this invention, several factors must be carefully controlled. In the first place, the silica and cellulating agent of carbonaceous material must be finely ground and intimately mixed. For example, the average particle size of the silica must be in the order of magnitude of 10 microns or less, preferably in the range of 2 to 4 microns. The particles of the cellulating agent should be no larger than the silica particles and preferably substantially smaller to insure uniform dispersion. The cellulating agent must be uniformly dispersed throughout the particles of silica so that the mass of solid particles is substantially homogeneous. An efficient way of attaining this result is to mix the carbonaceous cellulating agent and silica, such as quartz sand, in a ball mill and continue the grinding and mixing process until the average particle size is reduced to the range identified above.

A second feature of importance in the achievement of satisfactory cellular silica is the step of sintering the solid material at a temperature such that the silica particles soften and cohere into a highly viscous, but plastic, vitreous mass which contains the particles of cellulating agent therein. The temperature must be sufficiently high to cause the silica particles to cohere or coalesce and therefore must be ordinarily at least about 2600° F. However, the temperature of the sintering step must not be so high that the cellulating agent tends to react with the silica to form gaseous products. Therefore, the temperature should be maintained below about 2950° F. The preferred range is 2900° to 2950° F. The time required for the sintering step depends upon the weight of the charge being sintered, the particle size, the compactness of the mixture and the dimensions (particularly the thickness) of the charge. For example, in laboratory runs the sintering can be accomplished in about 3 minutes using charges weighing a few grams. On the other hand when large scale runs are carried out to produce cellulated silica in the form of blocks having dimensions of 2 to 4 inches thick and 1 or 2 feet in cross-section, 12 to 15 lbs. of charge may be required and the sintering time may be increased to 15 to 35 minutes. Likewise, the compactness of the charge has a definite bearing on the transmission of heat throughout the charge, and charges which have been pressed or tamped prior to sintering conduct heat more rapidly than does loose material. The optimum time for the sintering step can be readily experimentally established by observing the action of the charge when in a furnace at sintering temperatures. It shrinks and forms a vitreous body and when this is accomplished the sintering step is substantially complete.

A third factor which is of substantial importance is that after the sintering of the charge has been completed the temperature is raised rapidly to a level at which reaction zetween the carbonaceous material and the silica takes place with the formation of gases which expand the viscous mass into a cellulated body. Generally this temperature is 3150° F. or higher, but usually not exceeding 3300° F. because above that level poor uniformity of cells is found. The time required for the completion of the cellulation step in the temperature range of 3200° F. to 3300° F. will vary, of course, with the size of the batch and the dimensions thereof. On a laboratory scale, cellulation may be completed in 1 to 5 minutes, whereas on a commercial scale the cellulation may require 10 to 20 minutes. As a general rule, the time of cellulation is about one-half that required for the sintering step and generally is in the range of 40% to 60% of the sintering time for large scale commercial operations. The optimum time for cellulation for any particular batch can be readily determined experimentally.

Fourth, it is important that after optimum expansion and cellulation of the mass has taken place the temperature of the cellulated silica be rapidly dropped to prevent contraction or collapse of the cells which would result in shrinking or "dishing" of the cellulated body. It has been found that if the mass is kept at cellulating temperature, for example in the range of 3200° to 3300° F., for an extended period of time, the cells will break down, causing shrinking or distortion of the cellulated material. For this reason, the product should be withdrawn from the cellulating temperature zone to a cooler zone which is generally below 2950° F., and usually in the range of 2600° to 2950° F., as rapidly as possible after maximum cellulation has occurred in order to chill the outside surfaces of the ware and maintain its shape consistent with maximum cellulation. In the interior, cellulation continues after it has ceased near the surface due to the time lag of heat transfer through the material. The central part of the body will thereafter harden with good cellulation.

In the production of the cellulated silica, various forms of commercially pure silica may be employed as the principal ingredient of the batch which is prepared for cellulating. For example, quartz sand has been found to be highly desirable in the practice of the invention. Likewise, flint, chalcedony, jasper, and other forms of silica may be used if of sufficient purity. Usually the amount of silica to be employed in the batch to be cellulated constitutes more than 90 percent of the batch, preferably 95 to 99.5 percent by weight of the batch with the remainder constituting the carbonaceous cellulating agent and certain other auxiliary compounds such as metal oxides which may be used as hereinafter more fully described. However, small amounts, up to 10 percent by weight, of natural mineral silicates such as feldspar may be substituted for the silica in the batch.

On a commercial scale the silica is finely pulverized, for example, to a particle size that will pass through a screen of 325 mesh or finer. This finely pulverized material may be ground with the carbonaceous cellulating agent, e.g. lampblack. The amount of finely divided carbonaceous material is susceptible of variation but, in any event, the amount required is never very large, usually being within the range of 0.1 to 5 percent by weight of the batch. In addition to lampblack and other forms of finely divided carbon, such as graphite, other finely divided carbonaceous cellulating agents which are suitable include silicon carbide, boron carbide, chromium carbide and zirconium carbide. These carbonaceous cellulating agents are preferably used in an extremely fine form, in the millimicron particle size range. Any gases adsorbed by the carbon have to be driven off prior to sintering, otherwise they expand prematurely in the vitreous mass of sintered silica.

These carbonaceous materials remain solid at temperatures up to and exceeding 3300° F. and, therefore, do not change in physical form during the sintering and cellulating steps although they do, of course, react with the silica at temperatures above the sintering temperature range to produce the necessary gases for expansion and cellulation. The gases which are produced by the reaction of carbonaceous cellulating material and silica include oxides of carbon and silicon monoxide, the latter being produced by the reduction of silica by carbonaceous material. Silicon monoxide is a gas at cellulating temperature but is a solid at lower temperatures so that the cellulated silica produced by the expansion of silicon monoxide at 3200° to 3300° F. solidifies upon cooling of the cellulated silica with the resultant formation of evacuated cells containing about one-tenth atmosphere of carbon monoxide.

Cellulated silica can be produced by heating a mixture of silica and finely divided carbonaceous cellulating agent, such as described above, first to a temperature sufficient to sinter the silica and then to a temperature sufficient to cellulate the mass. However, it has been found, in accordance with a further embodiment of this invention that the addition of small quantities of certain compounds such as feldspar (particularly high potash feldspar), zirconium silicate, sodium borate, aluminum fluoride, lepidolite, lithium carbonate and the oxides of sodium, aluminum, boron and titanium, either singly or in combination, lowers the viscosity of the vitreous silica and allows sintering and cellulation to take place more rapidly and at lower temperature than ordinarily, thereby aiding materially in the control of the size and regularity of the cells which are formed. The manner in which these compounds contribute to the control of the cell structure is not exactly known. The use of these compounds does appear, however, to better coordinate the sintering and cellulating operations in the formation of the cellulated product. In addition certain of the foregoing compounds retard devitrification of the cellulated silica and thereby enhance its properties.

The amount of such compound or compounds which are added to the mixture of pulverulent silica and carbonaceous cellulating agent is generally within 0.05 to 1.0 percent by weight of the final mixture, and preferably in the range of 0.1 to 0.2%. The components of the mixture above described are very carefully admixed, for example, by gradual or periodic addition of the carbon and metal salt or oxide to the silica as it is being ground in a ball mill.

The mixture as described above is ground as fine as practicable (e.g., particles of 2 to 6 microns in size) in a ball mill and is then prepared for the heating operation. The mixture may be pressed into suitable self-sustaining shapes such as pellets, cones, slabs or bricks and placed on suitable supporting means such as graphite slabs, which are in turn introduced into the heating area. The pressing of the batch into self-sustaining shapes aids in the prevention of the formation of cracks in the mixture during cellulating and in more rapid heat conduction throughout the material. The mixture may also be compacted in graphite molds or trays, or poured loosely into graphite trays or molds without pressing or packing. The heating operation is performed in a reducing or inert atmosphere and may be done in a carbon-resistor electric furnace in which an atmosphere of inert or non-oxidizing gas such as nitrogen or argon is maintained.

The batch can be heated in any convenient furnace, but in commercial operation a tunnel furnace having suitable means designed to move the supporting graphite trays through the heating zone is to be desired. It has been found desirable to place a layer of finely divided graphite on the graphite tray prior to the placing of the batch on the tray and also to apply a layer of finely divided graphite over the batch prior to heating. This technique is designed to prevent oxidation of the cellulating agent in the outer surface of the batch prior to the sintering of the silica and to prevent the cellulated material from adhering to the graphite slab or tray. However, this is not necessary when the heating is conducted in a reducing or non-oxidizing atmosphere or when it is desired to produce a skin on the cellulated silica.

As indicated above, the cellulated silica produced in accordance with this invention has an extremely low density in the range of 8 to 16 lbs. per cubic foot. Material having the lowest density in this range, that is, from 8 to 12 lbs. per cubic foot, is extremely difficult to produce with uniform cell size and distribution, and to achieve this result the conditions specified above must be carefully adhered to. Material having a density of 12 to 16 lbs. per cubic foot is somewhat simpler to make but likewise the conditions specified above must be carefully compiled with in order to produce material of uniform cell structure.

The invention is more fully illustrated by the following disclosure which is representative of examples within the general limitations of the invention. It will be readily appreciated by those skilled in the art that numerous modifications in temperatures, times, quantities of materials, particle size and the like, may be made without departing from the general scope of the invention described above. The examples are provided for the purpose of illustration only and are not intended to limit the invention in any way.

*Example I*

One hundred grams of quartz sand and 0.2 gram of finely divided carbon were ground together in a ball mill for three hours to an average particle size of about six microns. The ground homogeneous batch was then compressed into pellets and placed on graphite supporting slabs which were in turn placed in a carbon electric furnace having a nitrogen atmosphere.

The furnace was at a temperature of about 2200° F. and was raised to a temperature of 3300° F. over a period of 30 minutes during which time a sintered product was formed in about 3 minutes at 2800–2950° F. and a cellulated product was formed at 3200–3300° F. in about 1 to 2 minutes. The product was grey in color and had a density of approximately 14 pounds per cubic foot.

*Example II*

One hundred grams of quartz sand, 0.1 gram of titanium dioxide and 0.2 gram of finely divided carbon were ground together in a ball mill to a particle size of about six microns. The ground homogenous batch was then compressed into pellets and heated in a nitrogen atmosphere in carbon electric furnace at a temperature of 2850° F. for 5 minutes and at a temperature of 3250° F. for 5 minutes. A cellulated product having a large number of small uniform cells and having a density of about 14 lbs. per cubic foot was produced.

*Example III*

One hundred grams of flint, 0.2 gram of sodium oxide and 0.3 gram of finely divided carbon were ground together in a ball mill for three hours to a particle size of about six microns. A portion of the ground homogeneous batch was compressed into pellets and the pellets and the remainder of the batch were heated to a temperature of 2950° F. for 5 minutes, then to a temperature of 3250° F. for 2 minutes in a carbon electric tube furnace under an atmosphere of argon.

A cellulated product was obtained from both the pellets and loose batch. The cell structure of the product was uniform and the product had a density of about 10 lbs. per cubic foot.

*Example IV*

A homogeneous mixture of ninety-six grams of quartz sand, 4 grams of Custer feldspar and 0.2 gram of finely divided lampblack, all in pulverulent form of 3–5 micron size was heated in nitrogen atmosphere to a temperature of 2950° F. for 5 minutes and then to a temperature of 3250° F. for 3 minutes. A highly cellulated product having a density of about 8 lbs. per cubic foot was produced.

*Example V*

An intimate pulverulent mixture of 100 grams of quartz sand, 0.8 gram of zirconium silicate and 0.3 gram of carbon was pressed into pellets and heated in a reducing atmosphere to a temperature of 2950° F. for a period of 5 minutes and to 3250° F. for a period of 2 minutes to produce a cellulated product.

*Example VI*

A pulverulent mixture consisting of 100 grams of flint, 0.3 gram of boric oxide and 0.3 gram of carbon was pressed into pellets which were placed in a furnace under an argon atmosphere at 2300° F. The temperature was raised to 3250° F. over a period of 15 minutes, during which time the silica was sintered at a temperature range of 2900° to 2950° F. in about 3 minutes and cellulated at 3200° to 3250° F. in about 1 minute, to produce a suitable cellulated product.

*Example VII*

A mixture of 100 grams of quartz sand, 0.1 gram of titanium dioxide and 0.3 gram of carbon was ground in a ball mill for 3 hours until a particle size in the range of 3 to 5 microns was reached, and then pelletized.

The pellets were placed in a furnace with a nitrogen atmosphere at 2300° F. and exposed to a temperature of 3150° F. over a period of 15 minutes during which time the silica was sintered at a temperature range of 2900° to 2950° F. in about 3 minutes and cellulated at 3200° to 3250° F. in about 1 minute. A cellulated product having a density of about 14 lbs. per cubic foot was produced.

*Example VIII*

A mixture of 1000 lbs. of Ottawa quartz sand, 33.2 lbs. of Custer feldspar and 1.8 lbs. of lampblack was ground in a silica-lined ball mill to an average particle size of 2 to 4 microns. The mixture was allowed to flow by gravity into graphite trays (14½ x 20½ inches) to a depth of about 1 inch (about 12.5 lbs. per tray) and the trays were passed into a tunnel furnace containing a nitrogen atmosphere. The mixture of silica, feldspar and lampblack in the trays was passed through a section of the furnace maintained at 2950° F. (±10°) in a period of about 27 minutes, during which time the silica softened and sintered into a plastic viscous mass. The mixture in the trays then was passed through a section of the furnace maintained at a temperature of 3240° F. (±10°) in a period of about 14 minutes, during which time the silica was cellulated into a biscuit measuring about 14½ by 20½ by 3½ inches. The cellulated silica was then passed into a cooling section of the tunnel where the temperature was reduced to about 2900° F., thereby causing the cellulated silica to solidify to a rigid form. After about 15 minutes at 2900° F. or a lower temperature, the silica ware was removed from the tunnel, allowed to cool to ambient temperature, and trimmed to blocks 12 x 18 x 2 inches having a density of about 12 to 14 lbs. per cubic foot.

*Example IX*

A batch composed of 2000 lbs. of quartz sand, 7.4 lbs. of alumina, 3.6 lbs. of sodium carbonate, 7.0 lbs. of boric acid and 3.6 lbs. of lampblack was ground and mixed in a silica-lined ball mill for 13 hours, resulting in a homogeneous mixture in which the average particle size was not larger than 6 microns. The mixture was transferred to graphite trays and placed in a tunnel furnace with a nitrogen atmosphere, first at a temperature of 2920–2950° F. for 30 minutes to cause sintering of the silica, and then at a temperature of 3200–3250° F. for 15 minutes to cause cellulation. The cellulated ware was brought rapidly to a temperature below 2600° F. to cause solidification into rigid blocks, and then was trimmed to size. Specimens of the ware thus produced had densities of 12.4 to 12.5 lbs. per cubic foot.

What is claimed as new and is desired to be secured by Letters Patent of the United States is:

1. A method of making a cellular silica body containing closed cells, which comprises forming a homogeneous mixture of finely ground silica and from 0.1 to 5% by weight of a finely divided carbonaceous cellulating agent which remains solid at the softening temperature of silica, heating said mixture in a non-oxidizing atmosphere at a temperature in the range of about 2600° to about 2950° F. and for a period of time sufficient to cause the silica particles to soften and cohere into a highly viscous plastic mass containing the cellulating agent, then raising the temperature to a level in the range of about 3200° to about 3300° F. to cause the entrapped cellulating agent and silica to react to produce entrapped gases which expand to form closed cells within the plastic mass, and finally cooling the cellulated mass to a rigid body.

2. A method according to claim 1, wherein the average particle size of the silica and the carbonaceous cellulating agent is not greater than about 10 microns.

3. A method according to claim 1 wherein the carbonaceous cellulating agent is carbon.

4. A method according to claim 1 wherein the carbonaceous cellulating agent is silicon carbide.

5. A method according to claim 1 wherein the homogeneous mixture of silica and carbonaceous cellulating agent contains boron oxide in amount of 0.05 to 0.5% by weight of the mixture.

6. A method according to claim 1 wherein the homogeneous mixture of silica and carbonaceous cellulating agent contains titanium oxide in amount of 0.05 to 0.2% by weight of the mixture.

7. A method according to claim 1 wherein the homogeneous mixture of silica and carbonaceous cellulating agent contains zirconium silicate in amount of 0.1 to 2.0% by weight of the mixture.

8. A method according to claim 1 wherein the homogeneous mixture of silica and carbonaceous cellulating agent contains sodium oxide in amount of 0.05 to 0.5% by weight of the mixture.

9. A method of making a cellular silica body containing closed cells, which comprises forming a homogeneous mixture of silica and from 0.1 to 5% by weight of carbon, the average particle size of said mixture being not greater than about 10 microns, heating said mixture in a non-oxidizing atmosphere at a temperature in the range of about 2600° to about 2950° F. for a period of time sufficient to cause the particles of silica to soften and cohere into a highly viscous plastic mass containing carbon particles uniformly distributed therethrough, then raising the temperature to about 3200° to 3300° F. for a period of time sufficient to cause the carbon particles to react with part of the silica to produce entrapped gases which expand to form closed cells within the plastic mass, and finally cooling the cellulated mass to a rigid cellulated body.

10. A method according to claim 9 wherein the silica and carbon are ground together to form a homogeneous mixture wherein the average particle size is not greater than about 10 microns.

11. A body of cellulated silica consisting essentially of regularly distributed closed cells of substantially uniform size and having a density of about 8 to 16 lbs. per cubic foot.

12. A body of cellulated silica as defined in claim 11 wherein the cells have a uniform diameter in the range of 1/32 to 1/16 inch.

References Cited in the file of this patent
UNITED STATES PATENTS

| | | |
|---|---|---|
| 1,669,363 | Watson | May 8, 1928 |
| 2,466,001 | Burwell | Apr. 5, 1949 |
| 2,544,954 | Ford | Mar. 13, 1951 |
| 2,758,937 | Ford | Aug. 14, 1956 |